(12) United States Patent
Vaserfirer

(10) Patent No.: US 7,190,267 B2
(45) Date of Patent: Mar. 13, 2007

(54) SYSTEM AND METHOD FOR MANAGING POWER CONTROL AND DATA COMMUNICATION AMONG DEVICES

(75) Inventor: Aleksandr Vaserfirer, Plano, TX (US)

(73) Assignee: Alliance Systems, Ltd., Plano, TX (US)

( * ) Notice: Subject to any disclaimer, the term of this patent is extended or adjusted under 35 U.S.C. 154(b) by 246 days.

(21) Appl. No.: 11/027,161

(22) Filed: Dec. 30, 2004

(65) Prior Publication Data

US 2006/0149976 A1    Jul. 6, 2006

(51) Int. Cl.
*G05B 11/01* (2006.01)

(52) U.S. Cl. ............... 340/540; 340/310.11; 700/12

(58) Field of Classification Search ............. 340/540, 340/310.11, 310.12, 310.16, 425.2, 333; 700/9, 12
See application file for complete search history.

(56) References Cited

U.S. PATENT DOCUMENTS

| 4,138,669 | A | * | 2/1979 | Edison et al. ................ 700/9 |
| 4,686,641 | A | * | 8/1987 | Evans ................... 340/310.11 |
| 5,089,974 | A | * | 2/1992 | Demeyer et al. ...... 340/310.12 |
| 5,528,215 | A | * | 6/1996 | Siu et al. .............. 340/310.11 |
| 5,903,607 | A | * | 5/1999 | Tailliet .................. 340/310.16 |
| 7,124,184 | B2 | * | 10/2006 | Chung et al. .......... 340/310.16 |

* cited by examiner

*Primary Examiner*—John Tweel, Jr.
(74) *Attorney, Agent, or Firm*—Baker Botts L.L.P.

(57) ABSTRACT

A system for managing devices comprises a first device comprising a first interface and a second device comprising a second interface. The second interface is coupled to the first interface using a communication cable that comprises both power wires and data wires. The second device further comprises a power controller coupled to the second interface. The power controller detects at least one of a voltage or a current associated with the power wires of the communication cable. The power controller turns on a power supply associated with the second device in response to detecting at least one of the voltage or the current. The second device further comprises a data communication module coupled to the second interface. The data communication module communicates data between the first device and the second device using the data wires of the communication cable.

29 Claims, 2 Drawing Sheets

US 7,190,267 B2

SYSTEM AND METHOD FOR MANAGING POWER CONTROL AND DATA COMMUNICATION AMONG DEVICES

TECHNICAL FIELD OF THE INVENTION

This invention relates in general to computing systems and, more particularly, to systems and methods for managing power control and data communication among devices.

BACKGROUND OF THE INVENTION

The proliferation of advanced computing applications has generated the need for high-bandwidth functionality. Expansion subsystems comprising expansion slots and associated expansion cards can provide this additional functionality to a host computer. However, the operations of such an expansion subsystem and associated expansion chassis are currently managed locally, if at all. Alarm conditions in the expansion chassis can therefore cause loss of power in the system and/or a loss of data integrity in the system.

SUMMARY OF THE INVENTION

In one embodiment, a system for managing devices comprises a first device comprising a first interface and a second device comprising a second interface. The second interface is coupled to the first interface using a communication cable that comprises both power wires and data wires. The second device further comprises a power controller coupled to the second interface. The power controller detects at least one of a voltage or a current associated with the power wires of the communication cable. The power controller turns on a power supply associated with the second device in response to detecting at least one of the voltage or the current. The second device further comprises a data communication module coupled to the second interface. The data communication module communicates data between the first device and the second device using the data wires of the communication cable.

In another embodiment, a device comprises an interface that is coupled to an external device using a communication cable, wherein the communication cable comprises both power wires and data wires. The device further comprises a power controller coupled to the interface. The power controller detects at least one of a voltage or a current associated with the power wires of the communication cable. The power controller then turns on a power supply associated with the device in response to detecting at least one of the voltage or the current. The device also comprises a data communication module coupled to the interface. The data communication module communicates data to the external device using the data wires of the communication cable.

Various embodiments of the present invention may benefit from numerous advantages. It should be noted that one or more embodiments may benefit from some, none, or all of the advantages discussed below. One advantage is that a first device, such as a host computer, can manage the power control and data communication operations of a second device, such as an expansion chassis using a communication cable that provides both power wires and data wires. Such an arrangement can reduce power failures and the loss of data integrity. Moreover, in particular embodiments, a particular first device can manage the power and data operations of multiple other devices simultaneously. Furthermore, in a serial arrangement of devices coupled using communication cables comprising both power wires and data wires, a particular device can perform management operations for an expansion device and also be managed by a host device. In this regard, the device can itself serve as both a host device and an expansion device depending on its relationship with other devices.

Other advantages will be readily apparent to one having ordinary skill in the art from the following figures, descriptions, and claims.

BRIEF DESCRIPTION OF THE DRAWINGS

For a more complete understanding of the present invention and for further features and advantages, reference is now made to the following description, taken in conjunction with the accompanying drawings, in which.

DETAILED DESCRIPTION OF THE INVENTION

Figure 1:
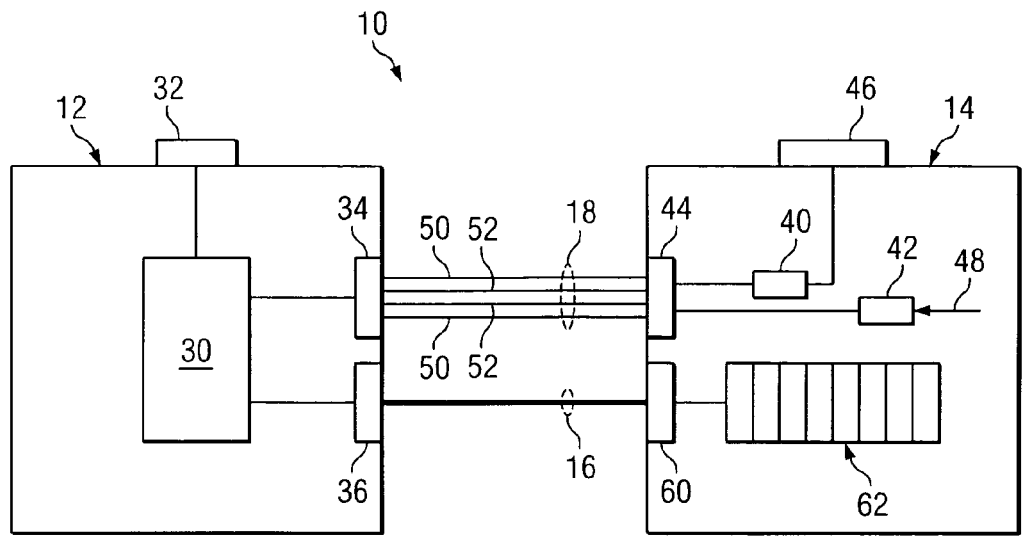
FIG. 1 illustrates an example system for managing the power control and data communication operations among devices.

FIG. 1 illustrates a system 10 that includes devices 12 and 14 coupled to each other using communication cables 16 and 18. In general, device 14 may enhance the functionality of device 12 using communication cable 16. Device 12 manages the power control and data communication operations of device 14 using communication cable 18.

Device 12 comprises a computer, a workstation, a server or any other suitable processing device that includes the appropriate hardware and software capabilities to communicate with device 14. Device 12 includes processor 30 coupled to power supply 32 and interfaces 34 and 36. Power supply 32 generally comprises any suitable component that supplies power to device 12. For example, device 12 may be plugged into an electrical outlet and power supply 32 can pull the appropriate amount of electricity and convert AC current to DC current. Power supply 32 may also regulate voltage to reduce spikes and surges that are common in many electrical systems.

Interfaces 34 and 36 comprise boundaries across which device 12 can communicate with device 14 using communication cables 16 and 18, respectively. In general, interfaces 34 and 36 comprise hardware interfaces that include the appropriate wires, plugs, and sockets that device 12 uses to communicate with cables 16 and 18, respectively. In particular embodiments, interface 34 comprises a Universal Serial Bus (USB) port or an IEEE 1394 port. Also in particular embodiments, interface 36 comprises a Peripheral Component Interconnect (PCI) port.

Device 14 comprises a computer, a workstation, a server, an expansion chassis, or any suitable processing device that includes the appropriate hardware and software capabilities to communicate with device 12. Device 14 comprises power controller 40 and data communication module 42 coupled to interface 44. Power controller 40 is further coupled to power supply 46.

Although the remainder of this description is detailed with reference to device 12, such as a host device or a master device, controlling the power and data operations of device 14, such as an expansion device or a slave device, it should be understood that in particular embodiments, device 14 controls the power and data operations of device 12. In these embodiments, for example, device 12 may comprise a power controller 40 coupled to power supply 32 and/or data communication module 42. In this regard, an expansion device or a slave device can control the power and data operations of a host device or a master device. Furthermore, in particular embodiments, devices 12 and 14 can both include the appropriate components, such as power controller 40 and/or data communication module 42 such that either device 12 can control the power and data operations of device 14, or device 14 can control the power and data operations of device 12, depending upon the mode of operation that is appropriate at the time. In this regard, the control of power and data operations among devices 12 and 14 is bi-directional in system 10.

Interface 44 is a counterpart to interface 34 and comprises an appropriate one of a USB port or an IEEE 1394 port depending upon the type of port that interface 34 comprises. Therefore, if interface 34 is a USB port, then interface 44 is a USB port and communication cable 18 comprises a USB cable. If interface 34 is an IEEE 1394 port, then interface 44 is an IEEE 1394 port and communication cable 18 comprises an IEEE 1394 cable. In either case, communication cable 18 comprises both power wires 50 and data wires 52.

Power controller 40 comprises any suitable number and combination of hardware and software components to detect the presence of voltage and/or current on power wires 50 of cable 18 and, in response, cause power supply 46 to turn on. In some embodiments, power controller 40 may be external to second device 14 but still coupled to devices 12 and 14 using power wires 50 of cable 18. In these embodiments, power controller 40 may still cause power supply 46 to turn on or off using a switch, or some other components of second device 14. Data communication module 42 comprises any suitable number of hardware and software components to receive and/or communicate data 48 to device 12 using data wires 52 of cable 18.

In a particular embodiment, data communication module 42 comprises an alarm module that determines alarm conditions associated with device 14 and communicates alarm information associated with these alarm conditions to device 12 using data wires 52 of cable 18. The alarm conditions determined by alarm module 42 may comprise temperature conditions, power supply conditions, voltage conditions or any other suitable environmental and/or operational conditions associated with device 14. In other embodiments, data communication module 42 comprises a data storage device, such as an appropriate form and type of memory, that can store information associated with device 14 and communicate this information to device 12 using the data wires 52 of cable 18. In still other embodiments, data communication module 42 comprises a hub (e.g., USB hub device or IEEE 1394 hub device) that is further coupled to a plurality of other communication devices that may or may not reside within device 14. In this embodiment, hub 42 communicates information associated with at least one of the other communication devices to device 12 using the data wires 52 of the cable 18.

Power supply 46 generally comprises any suitable component that supplies power to device 14. For example, device 14 may be plugged into an electrical outlet and power supply 46 can pull the appropriate amount of electricity and convert AC current to DC current. As described in greater detail below, power controller 40 can cause power supply 46 to turn on or turn off according to the detection of power on power wires 50, the state of operation of device 12, and/or alarm conditions associated with device 14.

In particular embodiments, device 14 also includes interface 60, such as a PCI port, and expansion subsystem 62. The proliferation of advanced computing applications has generated the need for high-bandwidth functionality. Expansion subsystem 62 may comprise expansion slots and associated expansion cards to provide this additional functionality. In some embodiments, the expansion subsystem 62 may comprise PCI expansion slots. Expansion subsystem 62 provides an extension of a communication bus outside of a host computer, such as device 12, to a remote computer, such as device 14. In such an arrangement, the remote computer 14 receives a bus signal from the host computer 12 using communication cable 16, such as a PCI expansion cable, and acts as if its an extended part of the host computer 12. Therefore, system 10 can transparently add the functionality of several expansion slots to the host computer 12.

In the past, communication cable 16 was not used to allow device 12 to manage the power control and data communication operations of device 14. However, in system 10, host computer 12 can manage the power and data operations of remote computer 14 using either communication cable 16 or 18. In this regard, host computer 12 can centrally manage multiple other devices 14 simultaneously. Without the power and/or data management capabilities that can now be provided by communication cables 16 or 18, the power and data operations of remote computer 12 are typically handled locally, if at all. This can lead to power failures and loss of data integrity.

The other parts of this description detail system 10 in terms of performing power and/or data control using communication cable 18, but it should be understood that communication cable 16 also includes power wires 50 and data wires 52 that can be used to allow device 12 to manage the power and/or data operations of device 14. Therefore, where the other parts of this description detail the use of communication cable 18 to perform power and/or data management operations, it should be understood that communication cable 16 may be used instead of cable 18 without departing from the scope of this disclosure. Therefore, in some embodiments, system 10 may comprise only one of cables 16 or 18 for performing the power and/or data operations described herein.

In operation, device 14 provides enhanced functionality to device 12 using expansion subsystem 62 and communication cable 16 coupled between devices 12 and 14. In previous systems, the power control and data communication operations of device 14 would be handled locally, if at all. However, in system 10, device 12 performs these management operations on behalf of device 14 using either communication cable 16 or 18. For example, when power supply 32 of device 12 turns on, interface 34 initiates and the power wires 50 of communication cable 18 draw power from power supply 32. This indicates to device 14 that device 12 is powered on. In particular, power controller 40 of device 14 detects a voltage and/or a current associated with power wires 50 and, in response, turns on power supply 46 of device 14. In one embodiment, power controller 40 only turns on power supply 46 if a voltage associated with power wires 50 exceeds a predetermined voltage threshold. Power controller 40 may also turn off power supply 46 of device 14 in response to detecting an insufficient voltage and/or current on power wires 50 of communication cable 18. This may represent that device 12 has been powered down. In this way, device 12 manages the power control of device 14.

Device 12 also manages the data communications of device 14. For example, data communication module 42 may receive data 48 representing alarm information associated with one or more alarm conditions existing within device 14. Data communication module 42 may then communicate this data 48 to device 12 using the data wires 52 of communication cable 18. The use of communication cable 18 that provides both power wires 50 and data wires 52 therefore provides significant advantages to system 10. In particular, device 12 can manage both the power and data operations of device 14 using a single communication cable 18. Such use of a single communication cable 18 is not only efficient and cost effective, but it provides safeguards against power failures and the loss of data integrity. For example, in the event data communication module 42 detects an alarm condition associated with device 14, such alarm information may be communicated as data 48 to device 12 using communication cable 18. In response, device 12 may initiate actions to power down device 14 using power wires 50 and/or data wires 52 of communication cable 18. In certain circumstances, device 12 accomplishes this by performing a graceful shutdown of its own components. Upon detecting the shutdown of device 12 as represented by an insufficient voltage and/or current on power wires 50 of cable 18, power controller 40 may also initiate a graceful shutdown of device 14. In this regard, damaging power failures can be avoided. Moreover, by performing graceful shutdowns of devices 12 and/or 14, data integrity is preserved on both devices 12 and 14.

Concurrently with the management by device 12 of the power and data operations of device 14, expansion subsystem 62 may provide enhanced functionality to device 12 in the form of increased expansion slots and expansion cards. The bus communications between device 12 and device 14 take place using communication cable 16 that is separate from communication cable 18. The power and/or data management operations may be performed using either communication cable 16 or 18.

Figure 2:
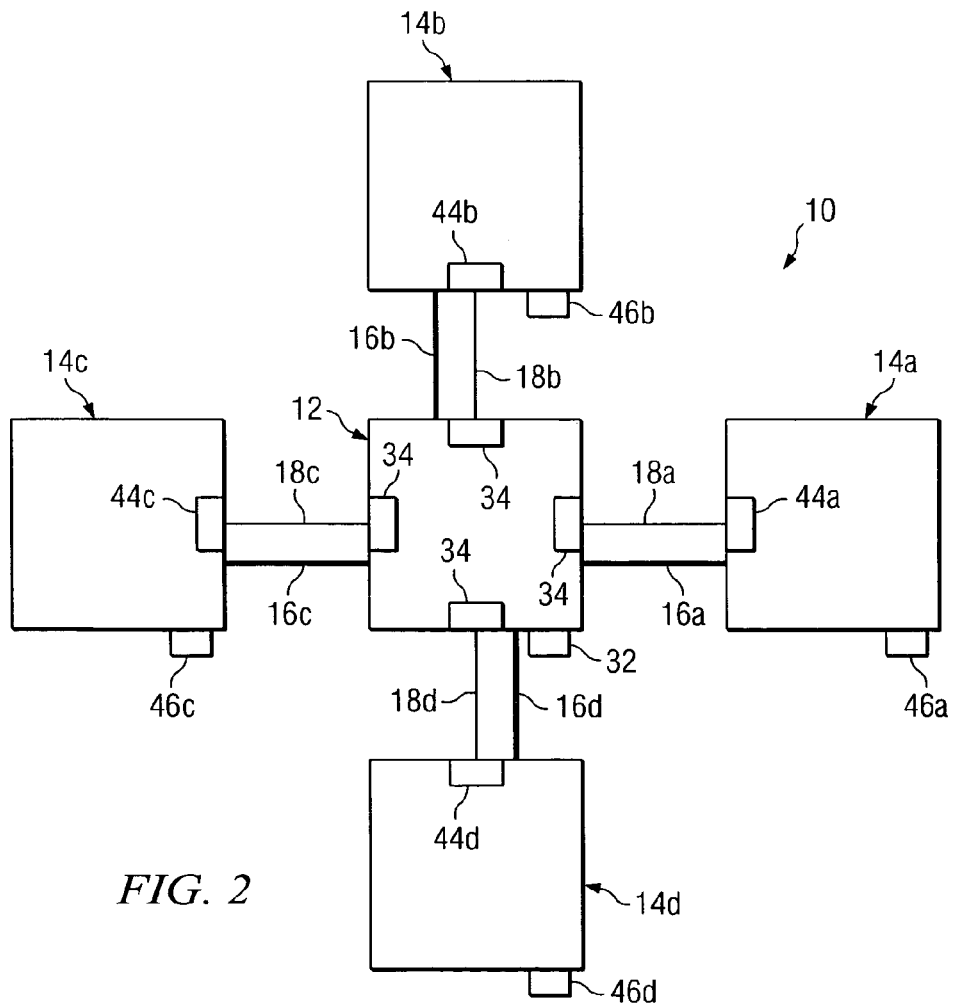
FIG. 2 illustrates an example arrangement of devices used in the system of FIG. 1.
Figure 3:
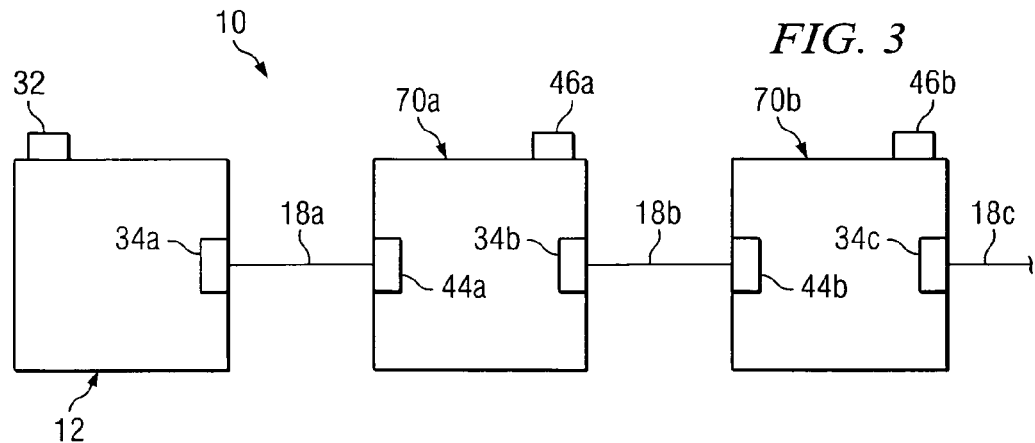
FIG. 3 illustrates another example arrangement of devices used in the system of FIG. 1.

FIGS. 2 and 3 illustrate example arrangements of devices 12 and 14 that are available in system 10. For example, FIG. 2 illustrates one embodiment of system 10 in which device 12 may manage the power control and data communication of multiple devices 14, such as devices 14a–14d. In this embodiment, device 12 is coupled to devices 14a, 14b, 14c, and 14d using communication cables 18a, 18b, 18c, and 18d, respectively. Although not illustrated in detail in FIG. 2, device 12 is also coupled to devices 14a, 14b, 14c and 14d using communication cables 16a, 16b, 16c, and 16d for the purposes of expansion. In this arrangement, device 12 can perform power and data management of devices 14 separately or in any suitable combination to reduce power failures and to avoid the loss of data integrity in system 10.

FIG. 3 illustrates yet another arrangement of devices in system 10. In particular, this arrangement includes a serial connection of devices 12, 70a, and 70b. Device 12 manages the power control and data communication operations of device 70a using communication cable 18a. In this regard, device 70a operates as a device 14 with respect to device 12 in that it is managed by device 12. However, device 70a may itself manage the power control and data communication operations of device 70b using communication cable 18b. In this regard, device 70a operates as a device 12 with respect to device 70b. Furthermore, device 70b operates as a device 14 with respect to device 70a, and operates as a device 12 with respect to additional devices 70, such as a device 70 that may be coupled using communication cable 18c. In this regard, devices 70 may manage other devices and be managed by other devices depending upon the relationship it has with the other devices in the serial arrangement. Moreover, the overall management of all devices 70 in system 10 may be performed by device 12.

System 10 contemplates any suitable number, combination, and arrangement of devices 12 and 14 coupled together using communication cables 16 and/or 18. The arrangement of devices 12 and 14 may comprise any suitable combination of the arrangements illustrated in FIGS. 2 and 3.

Figure 4:
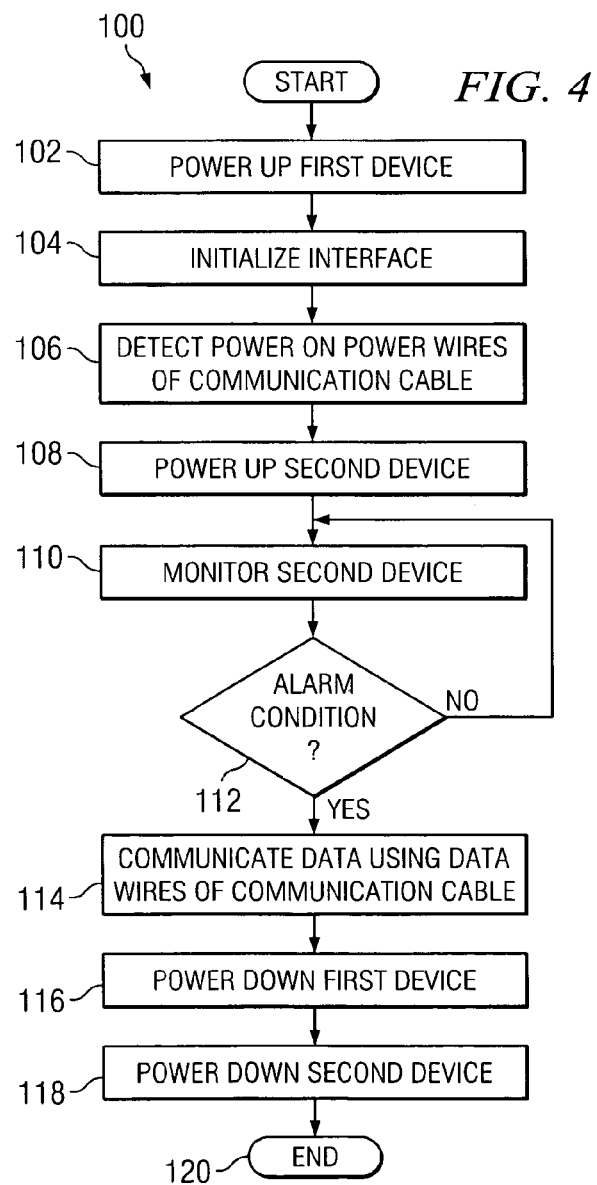
FIG. 4 is a flowchart illustrating an example method of managing the power control and data communication operations among devices.

FIG. 4 illustrates one embodiment of a method 100 for managing the power control and data communication operations among devices. Many of the steps in the following flowchart may take place simultaneously and/or in different orders than as shown. Moreover, method 100 may be performed with additional steps, fewer steps, and/or different steps, so long as the method remains appropriate. In addition, method 100 does not preclude other methods that may be performed in system 10.

Method 100 begins at step 102 where first device 12 powers up. In this regard, power supply 32 is providing power to device 12. Interface 34 initializes at step 104 so that communication cable 18 can be used to communicate between devices 12 and 14. Power controller 40 detects power on power wires 50 of communication cable 18 at step 106. In response, power controller 40 causes power supply 46 of second device 14 to turn on. Consequently, second device 14 powers up at step 108.

Data communication module 42, operating as an alarm module 42, monitors second device 14 at step 110. If the monitoring of second device 14 does not indicate an alarm condition, as determined at step 112, execution returns to step 110. If the monitoring does indicate an alarm condition, execution proceeds to step 114 where data communication module 42 communicates information about the alarm condition to first device 12 using the data wires 52 of communication cable 18. In one embodiment, first device 12 powers down at step 116 in response to the information communicated at step 114. Moreover, second device 14 powers down at 118 in response to the alarm conditions. In this regard, devices 12 and 14 perform a graceful power up and power down using information that is detected and/or communicated using the power wires 50 and the data wires 52, respectively, of communication cable 18. Execution terminates at step 120.

Although embodiments of the invention and their advantages are described in detail, a person skilled in the art could make various alterations, additions, and omissions without departing from the spirit and scope of the present invention as defined by the appended claims.

What is claimed is:

1. A system for managing devices, comprising:
   a first device comprising a first interface; and
   a second device comprising a second interface that is coupled to the first interface using a communication cable, wherein the communication cable comprises both power wires and data wires, the second device further comprising:
   a power controller coupled to the second interface and operable to:
   detect at least one of a voltage or a current associated with the power wires of the communication cable; and turn on a power supply associated with the second device in response to detecting at least one of the voltage or the current; and a data communication module coupled to the second interface and operable to communicate data between the first device and the second device using the data wires of the communication cable.

2. The system of claim 1, wherein the power controller turns on the power supply upon detecting a voltage associated with the power wires that exceeds a voltage threshold.

3. The system of claim 1, wherein the power controller is further operable to turn off the power supply upon detecting a voltage associated with the power wires that does not exceed a voltage threshold.

4. The system of claim 1, wherein the first device is operable to turn off a power supply associated with the first device in response to the communicated data.

5. The system of claim 1, wherein the power controller is further operable to turn off the power supply in response to data associated with the data communication module.

6. The system of claim 1, wherein the power controller detects at least one of a voltage or a current associated with the power wires of the communication cable in response to the first device being powered on.

7. The system of claim 1, wherein the data communication module comprises an alarm module operable to determine alarm conditions associated with the second device and to communicate alarm information associated with the alarm conditions to the first device using the data wires of the communication cable.

8. The system of claim 7, wherein the alarm conditions comprise at least one of:
    a temperature condition associated with the second device; and
    a power supply condition associated with the second device.

9. The system of claim 1, wherein the data communication module comprises a data storage device operable to store information associated with the second device and communicate the stored information to the first device using the data wires of the communication cable.

10. The system of claim 1, wherein the data communication module comprises a hub that is coupled to a plurality of communication devices and is operable to communicate information associated with at least one of the plurality of communication devices to the first device using the data wires of the communication cable.

11. The system of claim 1, wherein the communication cable comprises one of a Universal Serial Bus (USB) cable or an IEEE 1394 cable.

12. The system of claim 1, further comprising:
a third device comprising a third interface that is coupled to the first interface using a second communication cable, wherein the second communication cable comprises both power wires and data wires, the third device further comprising:
    a power controller coupled to the third interface and operable to:
        detect at least one of a voltage or a current associated with the power wires of the second communication cable; and
        turn on a power supply associated with the third device in response to detecting at least one of the voltage or the current; and
    a data communication module coupled to the third interface and operable to communicate data between the first device and the third device using the data wires of the second communication cable.

13. The system of claim 1, further comprising:
a third device comprising a third interface that is coupled to the second device using a second communication cable, wherein the second communication cable comprises both power wires and data wires, the third device further comprising:
    a power controller coupled to the third interface and operable to:
        detect at least one of a voltage or a current associated with the power wires of the second communication cable; and
        turn on a power supply associated with the third device in response to detecting at least one of the voltage or the current; and
    a data communication module coupled to the third interface and operable to communicate data between the first device and the third device using the data wires of the second communication cable.

14. The system of claim 1, wherein the first device further comprises a power controller that is coupled to the first interface and that is operable to:
    detect at least one of a voltage or a current associated with the power wires of the communication cable; and
    turn on a power supply associated with the first device in response to detecting at least one of the voltage or the current.

15. The system of claim 1, wherein the first device further comprises a data communication module coupled to the first interface and operable to communicate data between the first device and the second device using the data wires of the communication cable.

16. A device, comprising:
a interface that is coupled to an external device using a communication cable, wherein the communication cable comprises both power wires and data wires;
a power controller coupled to the interface and operable to:
    detect at least one of a voltage or a current associated with the power wires of the communication cable; and
    turn on a power supply associated with the device in response to detecting at least one of the voltage or the current; and
a data communication module coupled to the interface and operable to communicate data to the external device using the data wires of the communication cable.

17. The device of claim 16, wherein the power controller turns on the power supply upon detecting a voltage associated with the power wires that exceeds a voltage threshold.

18. The device of claim 16, wherein the power controller is further operable to turn off the power supply upon detecting a voltage associated with the power wires that does not exceed a voltage threshold.

19. The device of claim 16, wherein the power controller is further operable to turn off the power supply in response to data associated with the data communication module.

20. The device of claim 16, wherein the power controller detects at least one of a voltage or a current associated with the power wires of the communication cable in response to the external device being powered on.

21. The device of claim 16, wherein the data communication module comprises an alarm module operable to determine alarm conditions associated with the device and to communicate alarm information associated with the alarm conditions to the external device using the data wires of the communication cable.

22. The device of claim 21, wherein the alarm conditions comprise at least one of:
   a temperature condition associated with the device; and
   a power supply condition associated with the device.

23. The device of claim 16, wherein the data communication module comprises a data storage device operable to store information associated with the device and communicate the stored information to the external device using the data wires of the communication cable.

24. The device of claim 16, wherein the data communication module comprises a hub that is coupled to a plurality of communication devices and is operable to communicate information associated with at least one of the plurality of communication devices to the external device using the data wires of the communication cable.

25. The device of claim 16, wherein the communication cable comprises one of a Universal Serial Bus (USB) cable or an IEEE 1394 cable.

26. A method for managing devices, comprising:
   detecting a voltage associated with power wires of a communication cable that couples a first device and a second device;
   turning on a power supply of the second device in response to detecting the voltage; and
   communicating data associated with the second device to the first device using data wires of the same communication cable.

27. The method of claim 26, wherein the communication cable comprises one of a Universal Serial Bus (USB) cable or an IEEE 1394 cable.

28. The method of claim 26, wherein detecting the voltage associated with the power wires occurs in response to the first device being powered on.

29. The method of claim 26, further comprising turning off a power supply associated with the first device in response to the communicated data.

* * * * *